US005091727A

United States Patent [19]

Mahmood

[11] Patent Number: 5,091,727

[45] Date of Patent: Feb. 25, 1992

[54] FULLY OPTIMIZED AUTOMATIC PARKING FACILITY MANAGEMENT SYSTEM

[76] Inventor: Shahjahan Mahmood, 23 Clifton St., Cambridge, Mass. 02140

[21] Appl. No.: 592,649

[22] Filed: Oct. 14, 1990

[51] Int. Cl.[5] .............. B60Q 1/48

[52] U.S. Cl. .............. 340/932.2; 364/424.01; 235/384

[58] Field of Search .............. 340/932.2, 928; 364/424.01, 569, 550, 467; 235/384; 377/9

[56] References Cited

U.S. PATENT DOCUMENTS 3,376,547 4/1968 Auer, Jr. .............. 340/932.2
4,228,519 10/1980 Pfeifer .............. 340/932.2
4,603,390 7/1986 Mehdipour et al. .............. 340/932.2
4,737,758 4/1988 Meiksin et al. .............. 340/932.2

*Primary Examiner*—Donnie L. Crosland
*Attorney, Agent, or Firm*—Iandiorio & Dingman

[57] ABSTRACT

An automated parking facility management system which determines when a vehicle is at a facility entrance, stores the locations of vacated facility parking spots, determines the location of a desirable vacated parking spot in relation to either the facility entrance or the facility exit, prints a parking record for the customer including the computed location, removes the computed location from the memory after it has been printed to prevent assigning the same spot to two vehicles, and then adds the computed location back into the memory when the vehicle is leaving the facility to make the location available to another vehicle.

13 Claims, 6 Drawing Sheets

"CLOSEST TO ENTRANCE" ALGORITHM

"CLOSEST TO EXIT" ALGORITHM

FULLY OPTIMIZED AUTOMATIC PARKING FACILITY MANAGEMENT SYSTEM

FIELD OF INVENTION

This invention relates to an automated parking facility management system which automatically directs cars entering a parking facility to either the available space closest to the facility entrance or closest to a garage exit.

BACKGROUND OF INVENTION

Automobile parking facilities, for both multi-level garages and single level lots, are typically equipped with a mechanised entrance gate which imprints the time of day on a customer's ticket. When the customer leaves the garage, the attendant computes the automobile residence time from the ticket information and charges the customer accordingly. The customer typically after receiving the ticket must drive randomly throughout the facility to find an empty spot. At times, customers desire to park as close as possible to the entrance, and at other times customers desire to park as close as possible to one of the exits. In either case, however, the empty space is typically found at random.

There have been attempts in the past to better manage parking garages. For example, some garages are equipped with car counters at the entrance and exit of the garage; the difference between the two readings gives the attendant the total number of cars parked in the garage to allow the attendant to determine when the garage is full. There have also been attempts to provide such information to the customers as they drive through the garage by putting counters in each separate area of the garage, for example on each floor, so that as the customer drives through the area he/she knows whether or not there is an empty space in the area. However, he/she must then drive randomly through that area in order to find an empty spot.

In U.S. Pat. No. 4,310,890, there is disclosed the concept of providing individual meters for cars in the parking garage which accumulate parking information in accordance with displayed information. However, each of these approaches are cost-prohibitive because they require that hardware be installed either throughout the garage or be made available for each car entering the garage. In addition, each of the schemes solves only some of the problems associated with management of parking facilities.

SUMMARY OF INVENTION

It is therefore an object of this invention to provide the parking facility management system which automatically routes each vehicle entering the facility to an empty space.

It is a further object of this invention to provide such a system which eliminates the need for the driver to randomly locate an empty space.

It is a further object of this invention to provide such a system which does not require any hardware such as vehicle counters or meters to be installed in the garage or to be available for each car entering the garage.

It is a further object of this invention to provide such a system which automatically determines the parking charge due.

It is a further object of this invention to provide such a system which displays the occupancy status of any garage parking space, and provides for advanced reservation by a customer of a desired space.

This invention results from the realization that parking garage efficiency may be greatly increased by automatically determining for each car entering the facility the closest available space according to the customer's choice to prevent the need for random hunting for an empty space.

This invention features an automated parking facility management system including means for determining when a vehicle is at a facility entrance, a computer memory for storing the locations of vacated facility parking spots, means for determining the location of a desirable vacated parking spot in relation to the facility entrance or the facility exit, means for printing a parking record including the computed location, means for removing the computed location from the memory to prevent assigning the same spot to two vehicles, and means for adding the computed location back into the memory when the vehicle is leaving the facility to make the location available to another vehicle.

Preferably, the means for determining resolves the location of the vacated spot either closest to the entrance or closest to the exit. The printer may print the time of day on the record as well as the determined parking space. The printer may print in both man and machine readable versions to allow full automation of the facility. In that case, the means for adding the space back into the available space list when the vehicle leaves the garage may include a reading device for automatically reading the machine-readable version of the computed location. In a preferred embodiment, the printer prints the time of day in both man and machine-readable versions and the system then further includes means for resolving the time of day the vehicle leaves the facility. In that case, the system preferably included means, responsive to the means for resolving, for calculating the vehicle elapsed time in the parking facility and further includes means for determining the parking facility charge for the vehicle leaving the facility. Preferably, there are further included means responsive to the computer memory for displaying the locations of at least some of the vacated parking spots.

DISCLOSURE OF PREFERRED EMBODIMENT

, features and advantages will occur to those skilled in the art from the following description of a preferred embodiment and the accompanying drawings, in which.

This invention may be accomplished in an automated parking facility management system which determines when a vehicle is at the facility entrance, stores the locations of vacated facility parking spots, determines the location of a desirable vacated parking spot in relation to the facility entrance or the facility exit, prints that location on the parking record for the customer, and then removes the computed location from the memory to prevent assigning the same spot to two vehicles. The system then adds the computed locations back into the memory when the vehicle is leaving the facility to make the location available for another vehicle.

Figure 1:
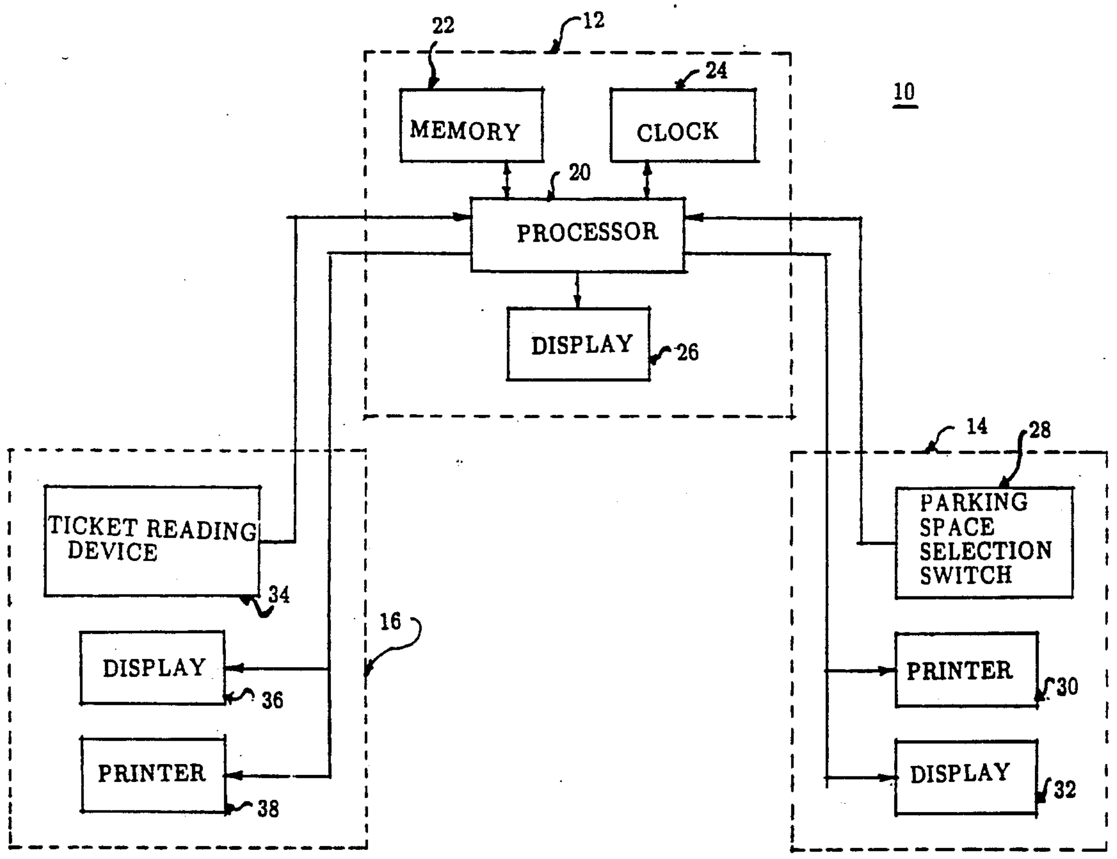
FIG. 1 is a block diagram of the automated parking facility management system according to this invention.

There is shown in FIG. 1 automated parking facility management system 10 according to this invention including computer system 12 which may be a microcomputer system, but is preferably a work-station type computer system which may be located at the attendant's booth or at another centralized management location as desired. System 12 includes computer memory 22 and clock 24 responsive to processor 20 and having display 26 such as a CRT for providing an operator display as is described below. Vehicle entry facility 14 includes a parking space criterion selection switch 28, ticket printer 30, and may include an attendant and/or customer display 32. At the vehicle exit facility 16 there is included a parking ticket reading device 34 along with an attendant and/or customer display 36 and receipt printer 38.

The system of this invention automatically determines the location of the empty parking space closest to either the garage entrance or a garage exit. When the customer enters the garage, he or she makes a choice of either the space closest to the entrance or closest to an exit with selection switch 28. Two types of exits are usually encountered in a parking garage: customer exits and car exits. A car exit is the one where an attendant deals with the calculations and collection of the parking charges when the car leaves the garage. Most of the medium sized garages are equipped with only one car exit. But a customer, after parking the car in the garage, is not restricted to leaving the garage through the car exit: he/she can also use a customer exit—an elevator or stairs.

If the car exit is defined as the "exit", then the shortest distance problem solved by the system of this invention has the same structure as the problem defining the shortest distance from the entrance point, and therefore the "closest to entrance" algorithm, described below, will be used to find an empty space closest to the car exit. On the other hand if the exit is taken as the customer exit, the structure of the problem changes as shown in FIG. 3B.

Figure 2A:
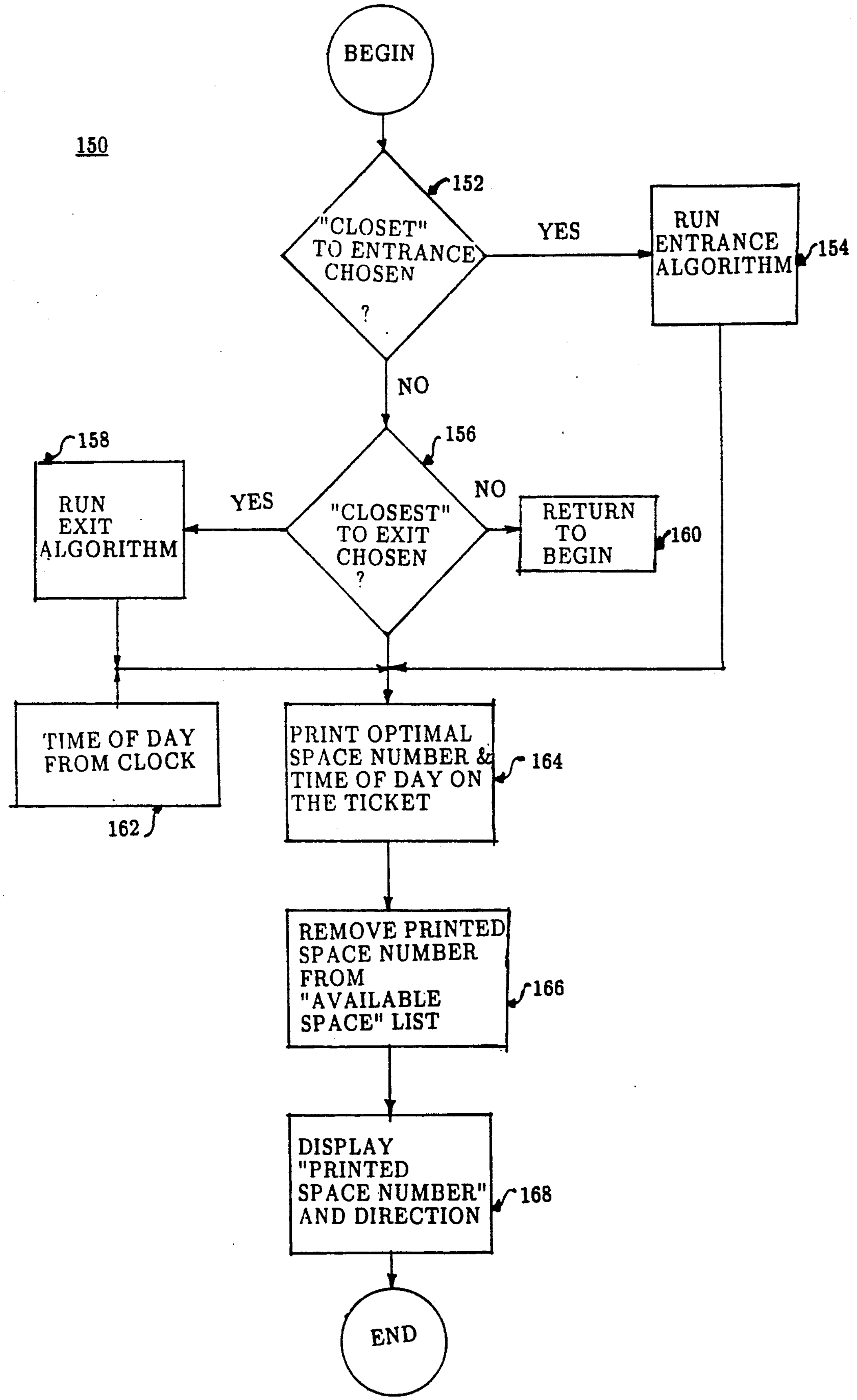
FIGS. 2A and 2B are flow charts for the processor of the system of FIG. 1 operated when a car enters and leaves the facility, respectfully.

Whatever the definition of the exit is, when a customer selects a criterion for an empty space, system 12 operates algorithm 150, FIG. 2A. If the customer chooses to be assigned the space closest to the entrance, step 152, the system operates entrance algorithm 154, FIG. 4A. If the customer chooses a spot closest to a customer exit, step 156, the system runs exit algorithm 158, FIG. 4B. In this case, the system preferably locates the free space closest to any exit anywhere in the garage. However, the system may be enabled to allow a customer to limit the choice to one or more exits, in which case algorithm 158 is operated so as to take into account only the chosen exit or exits.

After the algorithm is run, printer 30, FIG. 1, prints the optimal space number and time of day from clock 24 on the customer's ticket, preferably in both man and machine-readable versions. The system at step 166, FIG. 2A, then removes the printed optimal space number from its available space list in memory 22, and at step 168 displays the printed space number and, optionally, simple directions to the space on CRT display 32.

Figure 2B:
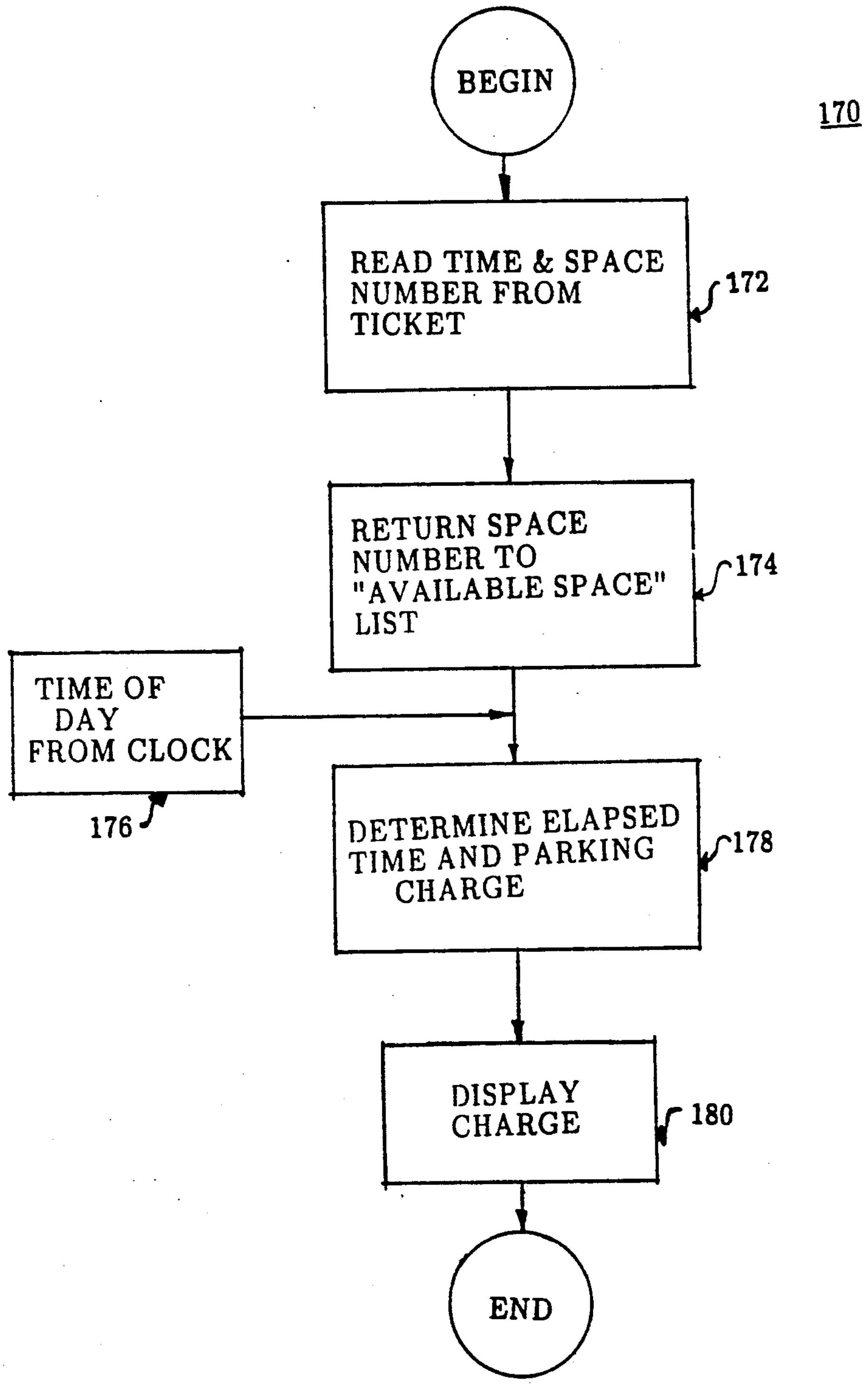

When a vehicle is leaving the facility, the customer or the parking attendant inserts the customer's ticket in reading device 34, FIG. 1, which may be an optical character recognition device or a bar code reading device depending on the ticket printing convention employed. The reader at step 172, FIG. 2B, extracts from the ticket the printed time of day that the vehicle had entered the facility, along with the assigned parking space. At step 174, the assigned space number is returned to the available space list held in memory 22. The system then extracts the time of day from clock 24 at step 176, and at step 178 determines the elapsed time and the parking charge. Since the parking charge calculation is automatic ,the system may be enabled to take into account variable parking rates, for example by charging a lesser rate at off-peak hours. At step 180, the parking charge is displayed so the customer may pay the attendant.

Figure 3A:
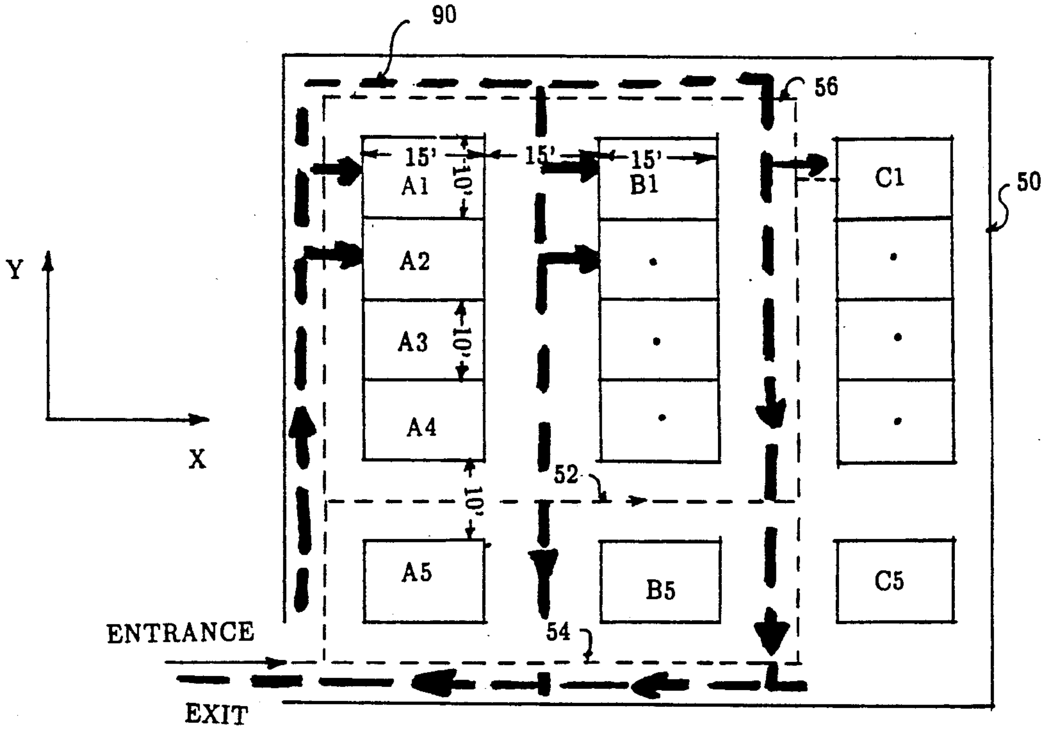
FIGS. 3A and 3B are schematic diagrams of a single story parking facility and one story of a multi-story garage parking facility, respectively for illustrating the manner in which the system of this invention determines the closest available parking spot.
Figure 3B:
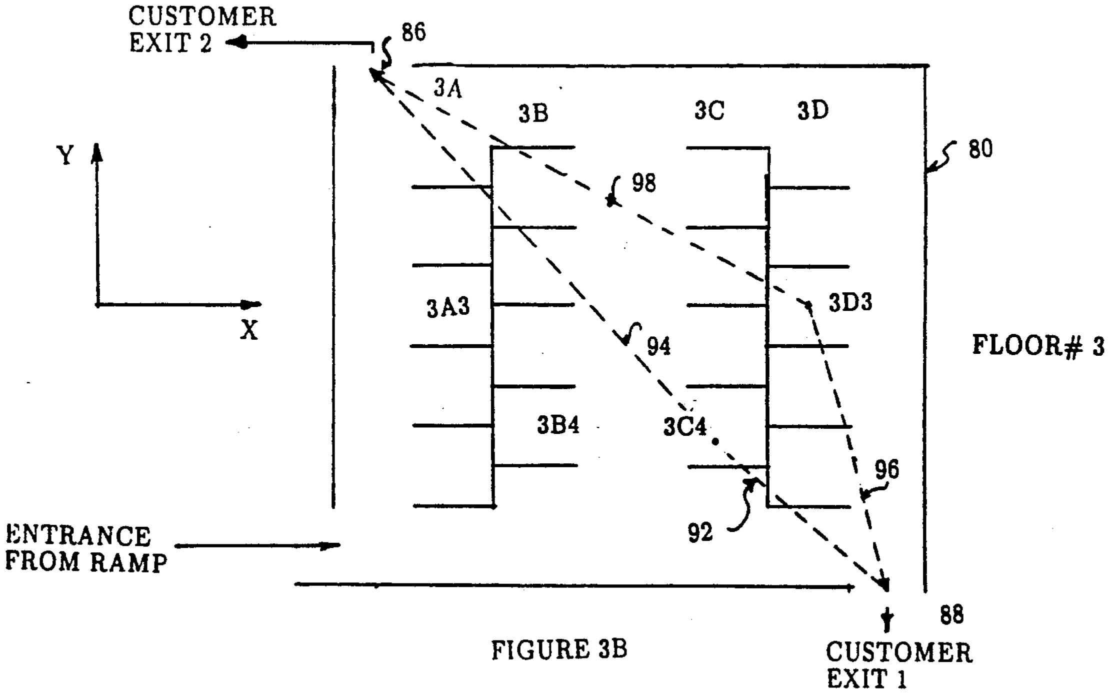

Simplified floor plans for a single story garage and one floor of a multi-story garage are schematically depicted in FIGS. 3A and 3B, respectively. These figures will help to explain the operation of the algorithms of FIGS. 4A and 4B for determining the closest available parking space. Parking garage 50, FIG. 3A includes parking spaces A1–A5, B1–B5, and C1–C5 set so there are several rows and columns which can be driven in between the entrance and any one of the spots. This illustrates the fact that it is not possible to drive in a straight line from the entrance to a parking spot. Rather, the driver must stay within the designated rows and columns in order to drive from the entrance to the parking space. In most of the garages, the lanes along which the car moves in search of empty spaces restrict the cars to move in only one direction. This is done to conserve space inside the garage and dedicate as much space as possible to parking rather than making wide corridors that would allow two cars from opposite directions to move freely. This "one-way" characteristic of the lanes would allow a car to reach a parking space in one, and only one, directed way. In other words, a unique path typically exists between the entrance point and each parking spot. In the example of FIG. 3A, alternate paths 52, 54 and 56 exist from the entrance point to space number C1 (the numbering system will be explained shortly). But the cars are restricted to move along the one-way lanes as shown by the heavy dashed lines 90, and therefore route 56 is the only allowable guided path to reach the space number C1. X and Y Cartesian coordinates are superimposed in the figure as a reference, as will be more fully explained below.

When the customer chooses to be assigned a space closest to an exit, the system preferably determines the distance from each free space in the garage to an exit on a straight line basis, operating under the assumption that the occupant will walk in more or less a straight line from his/her car to the exit. In the example shown, FIG. 3B, floor number 3 of a multi-story parking garage is generally designated as number 80 and includes rows 3A, 3B, 3C and 3D striped for a number of parking spots, including spots 3A3, 3B4, 3C4 and 3D3, and suppose that the spots 3C4 and 3D3 are empty. The system of this invention in locating the parking spot closest to an exit determines a straight line distance as shown by paths 92, 94, 96 and 98 from these two empty spots to exits 88 and 86, as shown. In this case, the shortest distance is path 92, and therefore the optimal space number for this floor is 3C4. But there may exist an empty spot on another floor whose distance from an exit may be shorter than the length of path 92. In that case, space 3C4 is not the globally optimal space number, and the search must be continued on other floors to find the space anywhere in the garage closest to any exit.

Figure 4A:
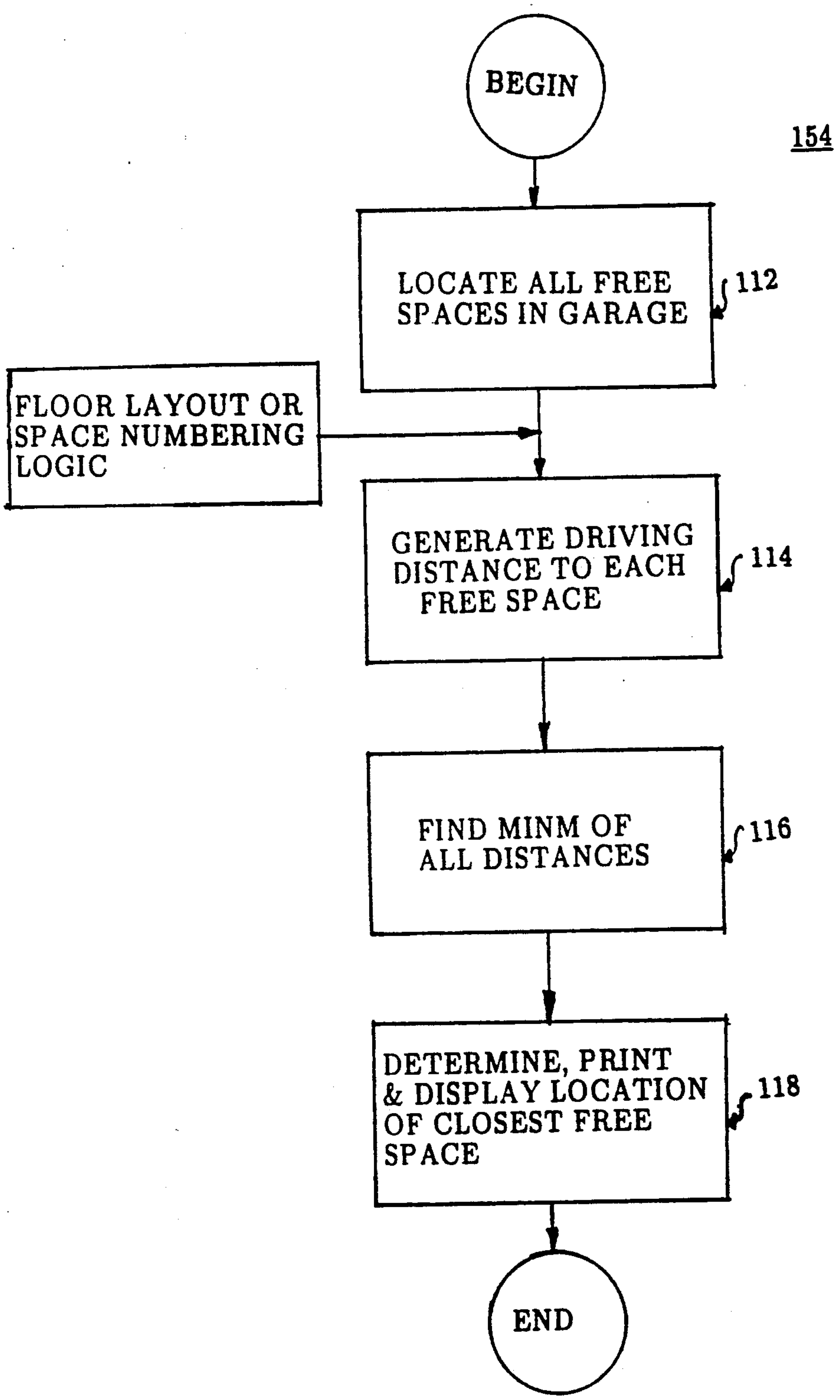
FIGS. 4A and 4B are flow charts of the entrance and exit algorithms of FIG. 2A.
Figure 4B:
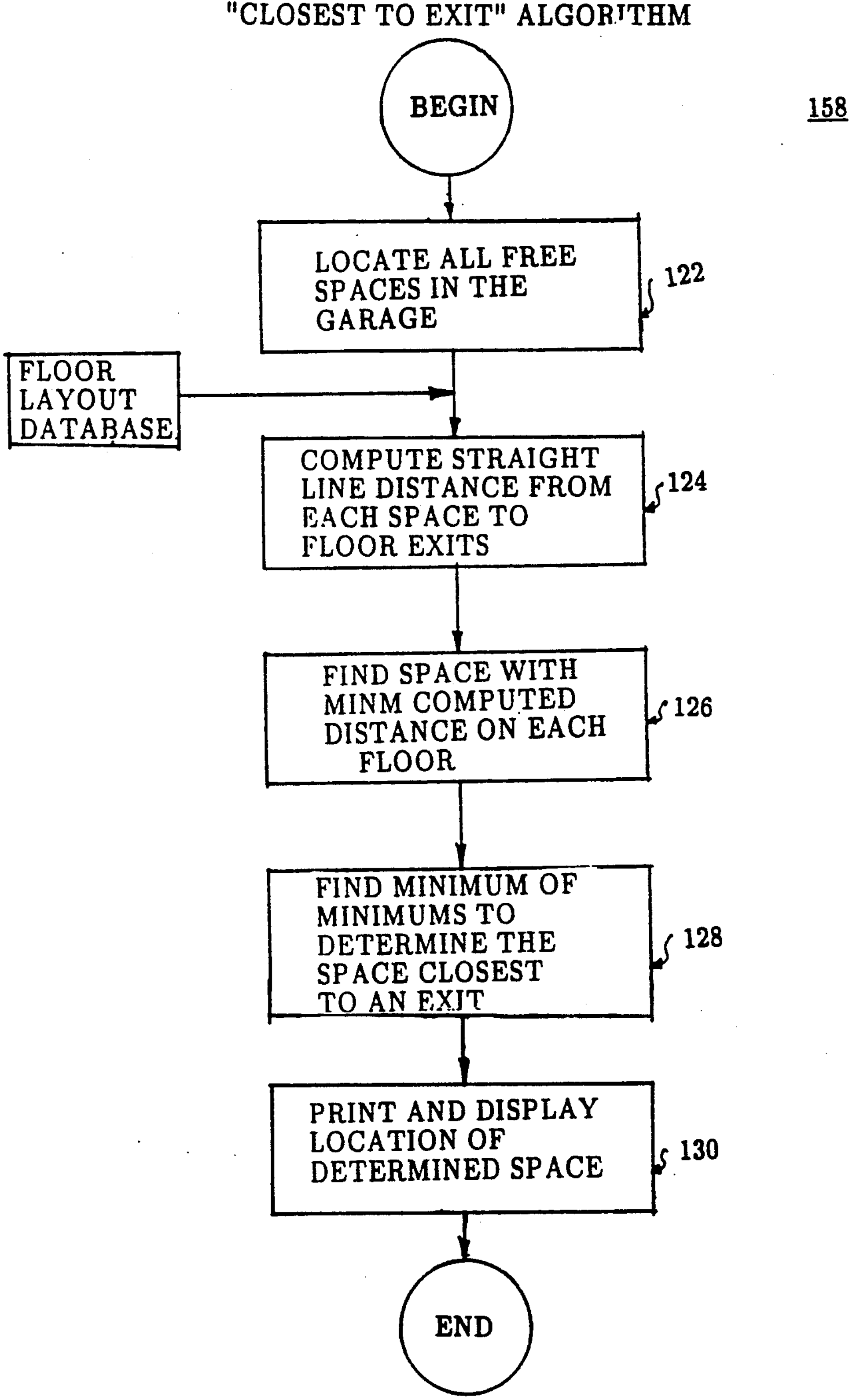

The operation of the system according to this invention can be understood more fully in reference to FIGS. 4A and 4B which, respectively, illustrate the "closest to entrance" algorithm and "closest to exit" algorithm. Algorithm 154, FIG. 4A, begins in step 112 by locating all free spaces in the garage. The algorithm then extracts from the memory the numbering logic and generates the driving distance to each free space on each floor at step 114.

Suppose in FIG. 3A, each parking space is 15'×10' and the empty row between A4 and A5 has the same geometry as that of the parking spaces. Then the driving distance from the entrance point to a space KJ, where K=A, B, or C, and J=1, 2, 3, 4, or 5 is given by:

$$d_{KJ} = \begin{cases} (4 - J)*10 + 20, \ 1 \leq J \leq 4, K = A \\ 0, J = 5, K = A \\ [\text{num}(K) - 1]*30 + \\ (J - 1)*10 + 60, \ 1 \leq J \leq 4, K = B, C \\ [\text{num}(K) - 1]*30 + 110, J = 5, K = B, C \end{cases}$$

where num(K) maps the letter K into sequential integers such as A=1, B=2, C=3, and dKJ is the distance in feet. For rectilinear geometry and one-way lanes, the distance of any space from the entrance point can be expressed in an analytical form as shown above. The complexity of the expression will depend upon floor layout of the garage. Alternatively, step 114 can be replaced by a lookup table resident in the system, for example in memory 22, FIG. 1, as shown below:

| Space No. | Driving Distance in Feet |
|---|---|
| A1 | 50 |
| A2 | 40 |
| A3 | 30 |
| A4 | 20 |
| A5 | 0 |
| B1 | 90 |
| B2 | 100 |
| . | |
| . | |
| . | |
| C1 | 120 |
| . | |
| . | |
| . | |
| C5 | 170 |

At step 116, FIG. 4A, the empty space number corresponding to smallest distance as per the above table is found. Any program of the type "bubble sort" can be used to put the space number corresponding to the shortest distance at the top of the list so that the first number in the list is assigned to the next incoming vehicle, at which time the number is removed from the "available list". At step 118, the system determines, prints and displays the location of the chosen free space with the least driving distance, at which time the algorithm ends.

Closest to exit algorithm 158, FIG. 4B, operates by first locating all free spaces in the garage, step 122, and then computing the straight line distance from each space to each exit on the floor after extracting the floor geometries from memory. Alternatively, the system may be enabled to allow the user to choose one or more customer exits, and in that case the straight line distance is computed from each space to only those exits. Again, this computation may be replaced by lookup tables which include the spaces ordered in relation to distance from each of the exits. In that case, the system scans the look up tables for the first available space. The system then proceeds to step 126, in which the space with the minimum computed distance on each floor is found. At step 128, the minimum of those minimums is determined, so that the algorithm in total determines the parking space anywhere in the garage closest to any customer exit. At step 130, that location is printed on the parking ticket and displayed for the customer, possibly along with directions to the space.

Preferably, the system is enabled so that the time of day and space number is printed in both man and machine readable form on the customer's ticket, so that the time and space number may be read from the ticket by the ticket reading device at the facility exit, and so that the customer may have a record of her space number and the time of day he/she entered the garage.

Since the facility management system of this invention is fully automated, the information contained within the system may be employed in a variety of manners to provide more optimal garage management. For example, the garage pricing structure, no matter how complex, may be built into memory 22, FIG. 1 and the system at the time the vehicle exits therefrom may automatically determine the total parking charge on the basis of the pricing policy for the garage. In addition, the system has the ability to record the time of arrival and time of departure of each car, and at the end of the day generate statistical data for the garage management indicating the number of cars that have resided in the garage during the day, the number of cars in the garage during each hour of the day, the length of stay, and the vehicle flow patterns. This information will be helpful to the garage management, particularly in the design of the pricing policy and the determination of optimal use of the garage.

In conjunction therewith, the system may be enabled to automatically audit the transactions occurring during the day by determining the total revenue of receipts during the entire day or any part of the day. These figures can be used to verify and audit the total receipts for any time period.

Another advantage of the automated system of this invention is that one or more displays may be provided for the management, such as display 26, FIG. 1, which display the occupancy status of any part of or the entire garage. For multi-story garage, a three dimensional display may be employed to show each floor and the status of each parking spot on each floor. This provides the ability to continuously check the status of each section or floor of the garage without having to physically drive or walk through the garage, thereby allowing quick and easy management of the garage, and determination when the entire garage or a floor or section is full. In addition, appropriate directing signs may be set up through the garage for directing customers to their chosen space. To facilitate this, the garage may be broken down into sections and subsections, and space numbers within subsections, to allow relatively easy designation of each space number in the garage. For example, a space number may be designated as "5B06", designating garage section 5, subsection B, and space number 6 within subsection B. For example, in a multi-story garage section 5 may be the fifth floor and subsection B a defined section of that floor. In any case, the garage signs will direct customers to the section and subsections at which time the space number will be readily visible or apparent.

Another advantage of this automated system is that spaces can be assigned to particular customers before they arrive. This can be accomplished by setting flags against the assigned space number in the memory 22 so that these spaces will not enter into the on-line allocation process. This capability will be useful if some customers rent spaces for a month or a year and those spaces must be reserved for those customers only. This feature may also be useful even for short term rentals. Suppose someone is taking a flight from an airport, and he/she wants to park the car at the airport. Before starting, the customer can call the airport garage management and request a parking spot. If a space is available, he/she is informed of the specific garage to go to and the assigned space number within that garage. The customer can then proceed directly to the assigned space.

Finally, the computerized automated system of this invention allows the ability to network systems of two or more garages, for example for use in an airport where there are typically a number of garages for the entire facility. In that case, the occupancy status of garages can be sent over a network to a central management location where the management can determine the status of each garage and alert the incoming traffic to that status to efficiently route vehicles to garages with empty spaces. This will provide the minimum inconvenience for the customers, as well as the efficient and simple management of an entire parking system at a centralized location.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An automated parking facility management system, comprising:

means for determining when a vehicle is at a facility entrance;

a computer memory for storing the locations of vacated facility parking spots;

means for determining the location of a desirable vacated parking spot in relation to at least one of the facility entrance and a facility exit;

means for printing a parking record including the determined location;

means for removing the determined location from the memory to prevent assigning the same spot to two vehicles; and means for adding the determined location back in to the memory when the vehicle is leaving the facility to make the location available to another vehicle.

2. The system of claim 1 in which said means for determining resolves the location of the vacated spot closest to the entrance.

3. The system of claim 1 in which said means for determining resolves the location of the vacated spot closest to a facility exit.

4. The system of claim 1 in which said means for printing further prints the time of day on the record.

5. The system of claim 1 in which said means for printing prints both man and machine-readable versions of the determined location.

6. The system of claim 5 in which said means for adding includes a reading device for automatically reading the machine-readable version of the determined location.

7. The system of claim 4 in which said means for printing prints the time of day in at least machine readable form.

8. The system of claim 7 in which said means for printing prints the time of day in both man and machine-readable versions.

9. The system of claim 7 further including means for resolving the time of day that the vehicle leaves the facility.

10. The system of claim 9 further including means, responsive to said means for resolving, for calculating the vehicle elapsed time in the parking facility.

11. The system of claim 10 further including means, responsive to said means for calculating, for determining the parking facility charge for the vehicle leaving the facility.

12. The system of claim 1 further including means, responsive to said computer memory, for displaying the locations of at least some of said vacated parking spots.

13. An automated parking facility management system comprising:

means for determining when a vehicle is at a facility entrance;

a computer memory for storing the locations of vacated facility parking spots;

means for determining the location of at least one of the vacated parking spot closest to the entrance and a vacated parking spot closest to a facility exit;

means for printing a parking record including the time of day and the determined location in at least a machine-readable version;

means for removing the determined location from the computer memory to prevent assigning the same spot to two vehicles;

means for reading the printed time of day and determined location from the record when the vehicle is leaving the facility;

means for calculating the vehicle elapsed time in the facility and computing the vehicle time charge; and means for adding the determined location back in to the memory to make the location available to another vehicle.

* * * * *